(12) United States Patent
Nakamura

(10) Patent No.: US 6,256,782 B1
(45) Date of Patent: *Jul. 3, 2001

(54) COMPILE APPARATUS, COMPILE METHOD AND COMPUTER-READABLE MEDIUM STORING COMPILER

(75) Inventor: Saori Nakamura, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,045

(22) Filed: Feb. 18, 1997

(30) Foreign Application Priority Data

Feb. 19, 1996 (JP) .................................................. 8-030914

(51) Int. Cl.⁷ ....................................................... G06F 9/45
(52) U.S. Cl. ........................................ 717/9; 717/5; 717/7
(58) Field of Search ................................... 395/707, 500, 395/375, 708, 706, 710; 704/9; 711/218; 364/300; 717/1, 7, 11, 5, 9, 10; 345/346

(56) References Cited

U.S. PATENT DOCUMENTS

| | | | |
|---|---|---|---|
| 4,989,145 | * | 1/1991 | Kyushima ................................ 704/9 |
| 5,095,432 | * | 3/1992 | Reed ........................................ 704/9 |
| 5,212,778 | * | 5/1993 | Dally et al. ........................... 711/218 |
| 5,488,714 | * | 1/1996 | Skidmore .............................. 395/500 |
| 5,517,628 | * | 5/1996 | Morrison et al. ..................... 395/581 |
| 5,655,065 | * | 8/1997 | Robertson et al. ................... 345/433 |
| 5,790,704 | * | 8/1998 | Rao et al. ............................. 382/237 |
| 5,790,854 | * | 8/1998 | Spielman et al. ........................ 717/1 |
| 5,956,479 | * | 9/1999 | McInerney et al. .................... 714/38 |
| 5,956,511 | * | 9/1999 | Tahara ...................................... 717/4 |
| 6,041,181 | * | 3/2000 | Ju et al. ................................... 717/9 |
| 6,141,374 | * | 10/2000 | Burns .................................. 375/152 |

FOREIGN PATENT DOCUMENTS

| | | |
|---|---|---|
| 0 428 084 | 5/1991 | (EP) . |
| 1-305434 | 12/1989 | (JP) . |

OTHER PUBLICATIONS

W. M. Waite et al., "Compiler Construction", pp. 346–353, Springer–Verlage New York Inc., 1984.
"Improved Bit String Manipulation in a RISC Processor", p. 406, IBM Technical Disclosure Bulletin, US, IBM Corp., New York, vol. 32, No. 8A, Jan. 1, 1990.
Sohi et al, "Multiscalar processors", ISAC ACM pp 414–425, 1995.*
Moreira et al, "Placement optimization using behavior based software agents and the genatic algorithm", ICECS ACM pp 255–258, 1996.*
Kasel et al,"Automated generation of SPICE characterization test mask and test database", IEEE, pp 74–79, 1999.*

* cited by examiner

Primary Examiner—Mark R. Powell
Assistant Examiner—Anil Khatri
(74) Attorney, Agent, or Firm—Young & Thompson

(57) ABSTRACT

A compile apparatus acquires at least one dedicated mask value-only register from registers with respect to a specific mask instruction, and allocates a variable and a constant to a register other than a mask instruction register. The apparatus further generates code wherein a mask value register is taken to be an operand, with respect to a mask instruction using a mask value and also generates code by an ordinary method with respect to other instructions. The apparatus inserts an instruction to set a mask value for mask instruction register into the head of a generated object program.

3 Claims, 3 Drawing Sheets

COMPILE APPARATUS, COMPILE METHOD AND COMPUTER-READABLE MEDIUM STORING COMPILER

BACKGROUND OF THE INVENTION

1. Field of the Invention

The present invention relates to a compile apparatus that compiles a source program and generates an object program, and particularly to a compile apparatus and a compiler which compile a source program, which generates a number of specific mask instructions when compiled, to generate an object program whose execution efficiency is improved and whose size is small.

2. Description of the Related Art

By generating an object program which uses as much data space as is available in a register, a compiler can enhance the execution efficiency of that object program and also can reduce the code size.

However, in the actual compile environment, there are cases where the data width prescribed by a programming language is shorter than the width of a hardware register. In the case where a source program written in such a programming language uses a variable of the short data type, it is necessary that a compiler sets operations invalidating the excess bits from the data width on the register, in the object program. In such case, a conventional compiler makes the excess bits from the data width on the register all zero, by generating bit conjunction instructions (hereinafter referred to as a mask instruction), where a value (hereinafter referred to as a mask value), in which specific bits are all unity is used and where bits other than specific bits of a value (which becomes an object of arithmetic operation) are made all zero.

Incidentally, it is easily predictable that a number of mask values and mask instructions appear in the generated object program, depending upon hardware which runs the object program and the language of the source program.

In the aforementioned conventional compiler, however, when a source program generating a number of mask values and mask instructions, as described above, is compiled, there is the need to set an instruction to set a mask value to a register every time a mask value appears. Therefore, in a function whose entire size is small, there is the problem that setting and executing this instruction is turned into overhead time to be reckoned with, and consequently, the problem that there are cases where the execution efficiency of the object program is reduced.

SUMMARY OF THE INVENTION

The present invention has been made to solve the above-described problem, and therefore, has an object to provide a compile apparatus, compile method and computer readable medium storing a compiler which generate an object program whose execution efficiency is better.

Furthermore, the present invention has another object to generate an object program whose size is small, by acquiring a dedicated register and minimizing generation of instructions to set a mask value to the register, with an explicit indication given by the user at the time of compilation in the case where it is predictable that a number of the same mask values are used.

A first compile apparatus in accordance with the present invention, comprises:

code generation means for inputting a source program and generating code of an object program, where a preacquired mask value-only register is used in a mask instruction; and mask value setting instruction insertion means for inserting an instruction to set a mask value to said preacquired mask value-only register into said code generated by said code generation means.

In a second compile apparatus in accordance with the present invention, said code generation means in the first compile apparatus in accordance with the present invention performs syntax analysis and optimization processing.

In a third compile apparatus in accordance with the present invention, said code generation means in the first compile apparatus in accordance with the present invention generates code wherein variable data and constant data are allocated to registers other than said preacquired mask value-only register, in instructions other than said mask instruction.

In a fourth compile apparatus in accordance the present invention, said code generation means in the third compile apparatus in accordance with the present invention performs syntax analysis and optimization processing.

A fifth compile apparatus in accordance with the present invention, comprises:

mask value-only register acquisition means for acquiring a dedicated mask value-only register for use in a mask instruction;

code generation means for inputting a source program and generating code of an object program, where said mask value-only register acquired by said mask value-only register acquisition means is used in said mask instruction; and mask value setting instruction insertion means for inserting an instruction to set a mask value to said mask value-only register acquired by said mask value-only register acquisition means into said code generated by said code generation means.

In a sixth compile apparatus in accordance with the present invention, said code generation means in the fifth compile apparatus in accordance with the present invention performs syntax analysis and optimization processing.

In a seventh compile apparatus in accordance with the present invention, said code generation means in the fifth compile apparatus in accordance with the present invention generates code wherein variable data and constant data are allocated to registers other than said mask value-only register acquired by said mask value-only register acquisition means, in instructions other than said mask instruction.

In an eighth compile apparatus in accordance with the present invention, said code generation means in the seventh compile apparatus in accordance with the present invention performs syntax analysis and optimization processing.

A ninth compile apparatus in accordance with the present invention, comprises:

code generation method selection means for inputting a user's indication that a mask value-only register is acquired only for use in a mask instruction;

mask value-only register acquisition means for acquiring said mask value-only register for use in a mask instruction, when said code generation method selection means inputs the indication that a mask value-only register is to be acquired;

code generation means for inputting a source program and generating code of an object program, where said mask value-only register acquired by said mask value-only register acquisition means is used in said mask instruction; and mask value setting instruction insertion means for inserting an instruction to set a mask value to said mask value-only register acquired by said mask value-only register acquisition means into said code generated by said code generation means.

In a tenth compile apparatus in accordance with the present invention, said code generation means in the ninth compile apparatus in accordance with the present invention performs syntax analysis and optimization processing.

In an eleventh compile apparatus in accordance with the present invention, said code generation means in the ninth compile apparatus in accordance with the present invention generates code wherein variable data and constant data are allocated to registers other than said mask value-only register acquired by said mask value-only register acquisition means, in instructions other than said mask instruction.

In a twelfth compile apparatus in accordance with the present invention, said code generation means in the eleventh compile apparatus in accordance with the present invention performs syntax analysis and optimization processing.

A first computer-implemented method of compiling in accordance with the present invention, comprises:
 a first step of inputting a source program;
 a second step of generating code of an object program, where a preacquired mask value-only register is used in a mask instruction; and
 a third step of inserting an instruction to set a mask value to said preacquired mask value-only register into said code generated in said second step.

In a second method of compiling in accordance with the present invention, the first method of compiling in accordance with the present invention further comprises the step of:
 performing syntax analysis and optimization processing.

In a third method of compiling in accordance with the present invention, said second step in the first method of compiling in accordance with the present invention further includes the step of generating code wherein variable data and constant data are allocated to registers other than said preacquired mask value-only register, in instructions other than said mask instruction.

In a fourth method of compiling in accordance with the present invention, the third method of compiling in accordance with the present invention further comprises the step of:
 performing syntax analysis and optimization processing.

A fifth computer-implemented method of compiling in accordance with the present invention, comprises:
 a first step of acquiring a dedicated mask value-only register for use in a mask instruction;
 a second step of inputting a source program;
 a third step of generating code of an object program, where said mask value-only register acquired in said first step is used in said mask instruction; and
 a fourth step of inserting an instruction to set a mask value to said mask value-only register acquired in said first step into said code generated in said third step.

In a sixth method of compiling in accordance with the present invention, the fifth method of compiling in accordance with the present invention further comprises the step of:
 performing syntax analysis and optimization processing.

In a seventh method of compiling in accordance with the present invention, said third step in the fifth method of compiling in accordance with the present invention further includes the step of generating code wherein variable data and constant data are allocated to registers other than said mask value-only register acquired in said first step, in instructions other than said mask instruction.

In an eighth method of compiling in accordance with the present invention, the seventh method of compiling in accordance with the present invention further comprises the step of:
 performing syntax analysis and optimization processing.

A ninth computer-implemented method of compiling in accordance with the present invention, comprises:
 a first step of inputting a user's indication that a mask value-only register is acquired only for use in a mask instruction;
 a second step of acquiring said mask value-only register for use in a mask instruction, when in said first step the indication that a mask value-only register is to be acquired is inputted;
 a third step of inputting a source program;
 a fourth step of generating code of an object program, where said mask value-only register acquired in said second step is used in said mask instruction; and
 a fifth step of inserting an instruction to set a mask value to said mask value-only register acquired in said second step into said code generated in said fourth step.

In a tenth method of compiling in accordance with the present invention, the ninth method of compiling in accordance with the present invention further comprises the step of:
 performing syntax analysis and optimization processing.

In an eleventh method of compiling in accordance with the present invention, said fourth step in the ninth method of compiling in accordance with the present invention further includes the step of generating code wherein variable data and constant data are allocated to registers other than said mask value-only register acquired in said second step, in instructions other than said mask instruction.

In a twelfth method of compiling in accordance with the present invention, the eleventh method of compiling in accordance with the present invention further comprises the step of:
 performing syntax analysis and optimization processing.

A first computer-readable medium in accordance with the present invention stores a compiling program on a data storage device, wherein the program comprises:
 a first data structure causing a computer to input a source program;
 a second data structure causing a computer to generate code of an object program, where a preacquired mask value-only register is used in a mask instruction; and
 a third data structure causing a computer to insert an instruction to set a mask value to said preacquired mask value-only register into said code generated using said second data structure.

In a second computer-readable medium in accordance with the present invention, said compiler in the first computer-readable medium in accordance with the present invention, further comprises:
 a data structure causing a computer to perform syntax analysis and optimization processing.

In a third computer-readable medium in accordance with the present invention, said second data structure in the first computer-readable medium in accordance with the present invention further includes a data structure causing a computer to generating code wherein variable data and constant data are allocated to registers other than said preacquired mask value-only register, in instructions other than said mask instruction.

In a fourth computer-readable medium in accordance with the present invention, said compiler in the third computer-readable medium in accordance with the present invention further comprises:

a data structure causing a computer to perform syntax analysis and optimization processing.

A fifth computer-readable medium in accordance with the present invention records a compiling program on a data storage device, wherein the program comprises:

a first data structure causing a computer to acquire a dedicated mask value-only register for use in a mask instruction;

a second data structure causing a computer to input a source program;

a third data structure causing a computer to generate code of an object program, where said mask value-only register acquired using said first data structure is used in said mask instruction; and a fourth data structure causing a computer to insert an instruction to set a mask value to said mask value-only register acquired using said first data structure into said code generated using said third data structure.

In a sixth computer-readable medium in accordance with the present invention, said compiler in the fifth computer-readable medium in accordance with the present invention further comprises:

a data structure causing a computer to perform syntax analysis and optimization processing.

In a seventh computer-readable medium in accordance with the present invention, said third data structure in the fifth computer-readable medium in accordance with the present invention further includes a data structure causing a computer to generate code wherein variable data and constant data are allocated to registers other than said mask value-only register acquired using said first data structure, in instructions other than said mask instruction.

In an eighth computer-readable medium in accordance with the present invention, said compiler in the seventh computer-readable medium in accordance with the present invention further comprises:

a data structure causing a computer to perform syntax analysis and optimization processing.

A ninth computer-readable medium in accordance with the present invention records a compiling program on a data storage device, wherein the program comprises:

a first data structure causing a computer to input a user's indication that a mask value-only register is acquired only for use in a mask instruction;

a second data structure causing a computer to acquire said mask value-only register for use in a mask instruction, when said first data structure indicates that a mask value-only register is to be acquired;

a third data structure causing a computer to input a source program;

a fourth data structure causing a computer to generate code of an object program, where said mask value-only register acquired using said second data structure is used in said mask instruction; and a fifth data structure causing a computer to insert an instruction to set a mask value to said mask value-only register acquired using said second data structure into said code generated using said fourth data structure.

In a tenth computer-readable medium in accordance with the present invention, said compiler in the ninth computer-readable medium in accordance with the present invention further comprises:

a data structure causing a computer to perform syntax analysis and optimization processing.

In an eleventh computer-readable medium in accordance with the present invention, said fourth data structure in the ninth computer-readable medium in accordance with the present invention further includes a data structure causing a computer to generate code wherein variable data and constant data are allocated to registers other than said mask value-only register acquired using said second data structure, in instructions other than said mask instruction.

In a twelfth computer-readable medium in accordance with the present invention, said compiler in the eleventh computer-readable medium in accordance with the present invention further comprises:

a data structure causing a computer to perform syntax analysis and optimization processing.

BRIEF DESCRIPTION OF THE DRAWINGS

The present invention will be better understood from the following detailed description, when read in conjunction with the accompanying drawings in which.

DETAILED DESCRIPTION OF THE PREFERRED EMBODIMENTS

Figure 1:
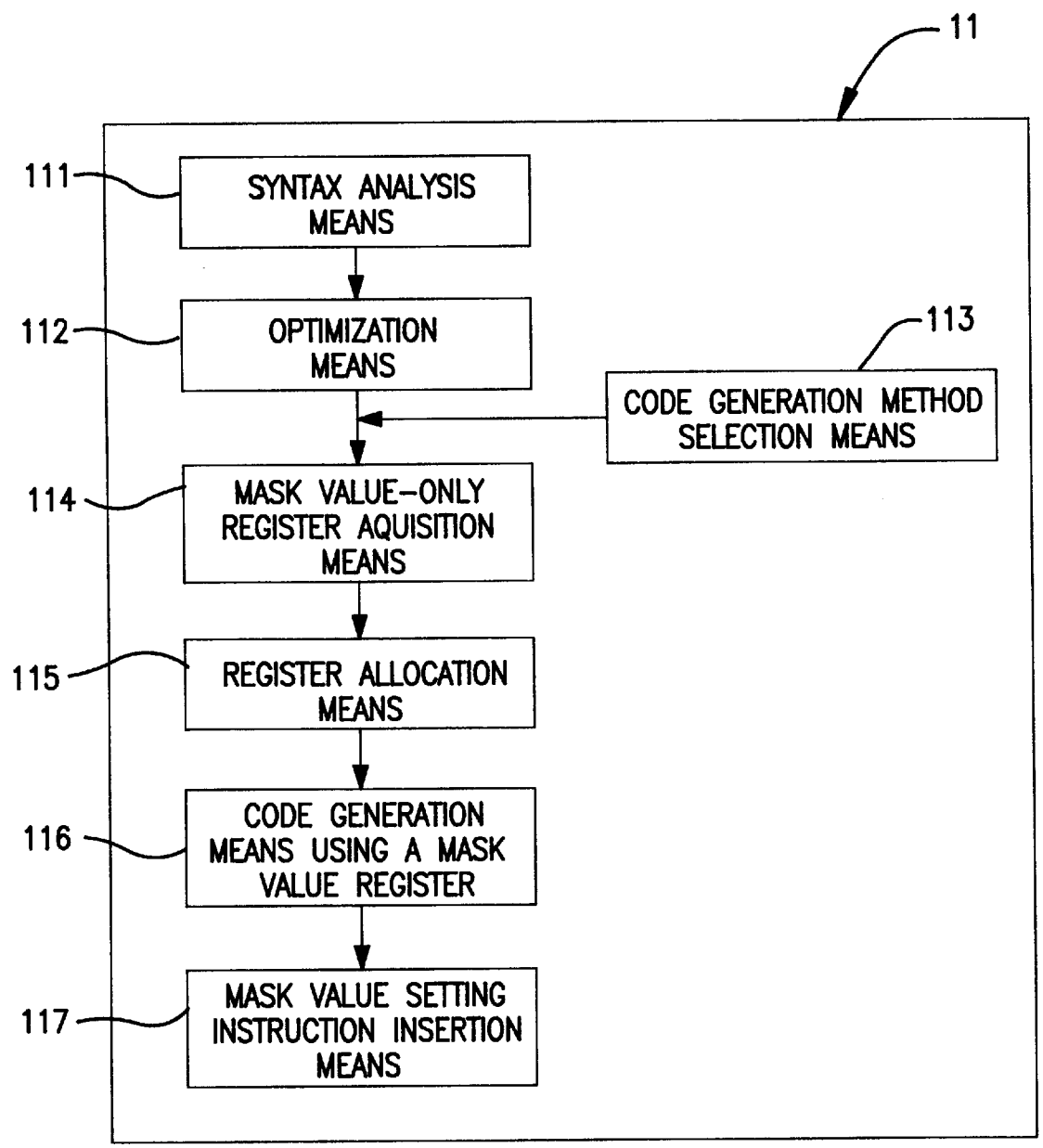
FIG. 1 is a block diagram of an embodiment of the present invention.

An embodiment of the present invention will here-inafter be described in detail while referring to the drawings.

Referring to FIG. 1, a first embodiment of the present invention is constructed so that compile apparatus 11 includes syntax analysis means 111 which inputs a source program and performs the grammatical error checking and structure analysis thereof (hereinafter referred to as syntax analysis) to convert it to an intermediate format program for performing deletion of a redundant code, movement of code, and replacement by a constant (these operations will hereinafter be referred to as optimization) with respect to a variable whose value has been set at compilation and also for performing register allocation; optimization means 112 which performs optimization with respect to the intermediate format program converted by the syntax analysis means 111 to convert it to an intermediate format program whose efficiency is better; code generation method selection means 113 which inputs a user's indication which specifies whether or not part of a register is acquired only for a specific mask instruction; mask value-only register acquisition means 114 which acquires part of a register which can be allocated at the time of code generation for a specific mask instruction only; register allocation means 115 which allocates a register other than the register acquired by the mask value-only register acquisition means 114 to a variable or a constant;

code generation means 116 which uses a mask instruction register as an operand with respect to a mask instruction having a specific mask value as an operand and then performs code generation; and mask value settin( instruction insertion means 117 which inserts an instruction to store a mask value in the acquired dedicated register into the head of an object program.

As a practical matter, the compile apparatus 11 of FIG. 1 will typically be a general purpose digital computer running the compiler described herein.

Figure 2:
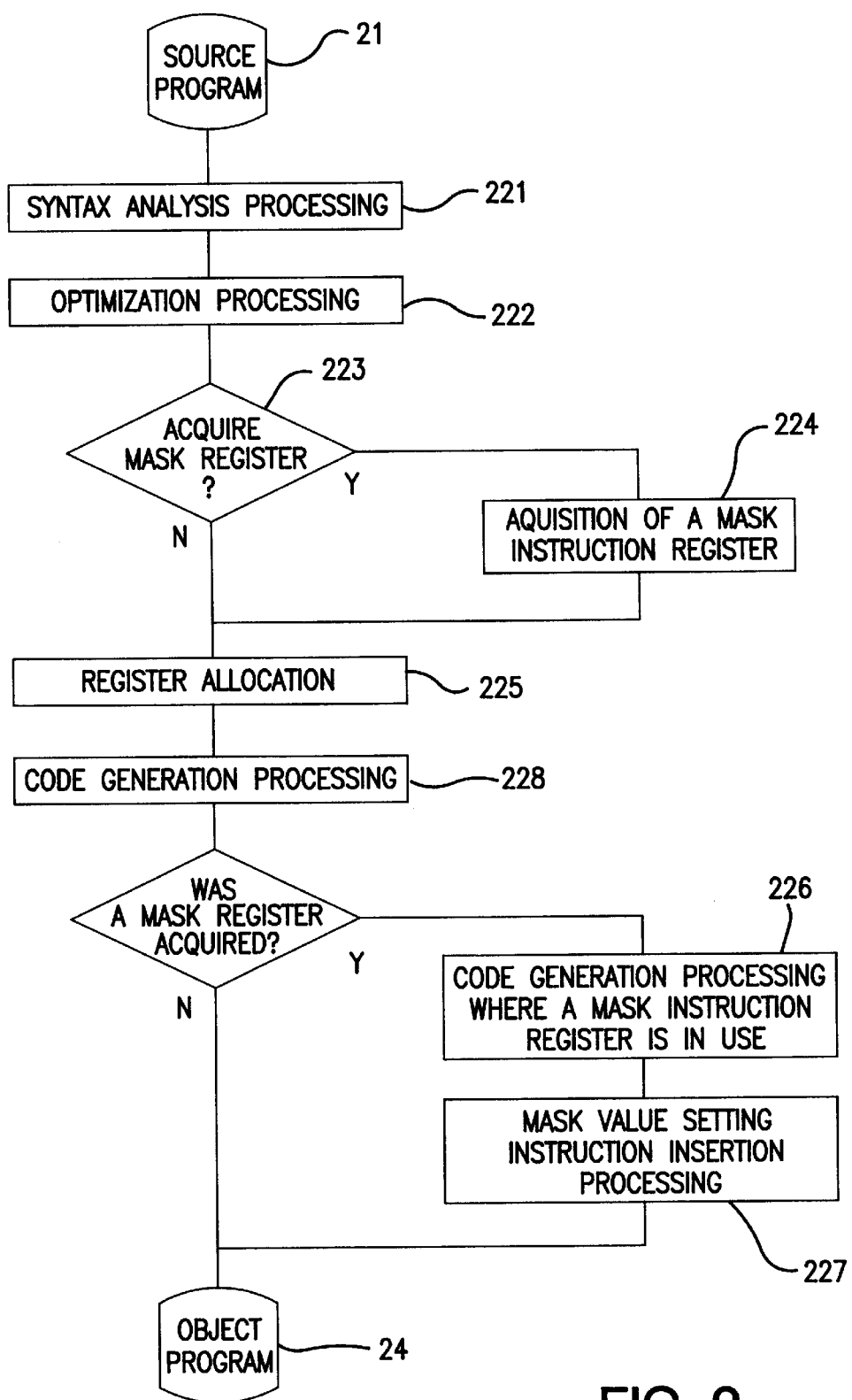
FIG. 2 is a flowchart showing the process per-formed by syntax analysis means 111, optimization means 112, code generation method selection means 113, mask value-only register acquisition means 114, register allocation means 115, code generation means 116, and mask value setting instruction insertion means 117 in the embodiment of FIG. 1.

The operation of the first embodiment of the present invention will hereinafter be described in reference to FIGS. 1 through 3.

If the compile apparatus 11 is started, initially syntax analysis means 111 performs syntax analysis processing with respect to source program 21 and converts it to intermediate language format (step 221).

The optimization means 112 performs optimization processing with respect to the intermediate language format program converted by the syntax analysis means 111 (step 222).

The code generation method selection means 113 inputs a user's indication which specifies whether or not part of a register is acquired only for a specific mask instruction (step 223). Note that the process of the step 223 by the code generation method selection means 113 can be performed at an. arbitrary point of time between the start of the compile apparatus 11 and the end time of step 222.

When the code generation method selection means 113 inputs a user's indication which specifies that part of a register is acquired only for a specific mask instruction, the mask value-only register acquisition means 114 acquires part of a register which is used for allocation for a specific mask instruction before register allocation is processed by the register allocation means 115 (step 224). The mask value is taken to be a value prescribed previously by the compiler or a value specified by the user.

The register allocation means 115 allocates a register other than the register acquired by the mask value-only register acquisition means 114 to a variable or a constant after the end of step 224 by the mask value-only register acquisition means 114 (step 225).

The code generation means 116 performs code generation with respect to the mask instruction using the aforementioned mask value by employing the acquired register as an operand instead of employing a mask value (step 226), and for other instructions, code generation is performed by an ordinary method (step 228).

Lastly, the mask value setting instruction insertion means 117 inserts an instruction to set a mask value to the acquired register into the head of a generated object program, that is, the first executed portion, after the end of step 226 by the code generation means 116 (step 227), and consequently, object program 24 is generated.

Note that when in step 223 the code generation method selection means 113 inputs a user's indication which specifies that part of a register is not acquired only for a. specific mask instruction, an ordinary object program 24 is; generated by step 225 of the register allocation means 115 and the code generation processing 228.

Figure 3:
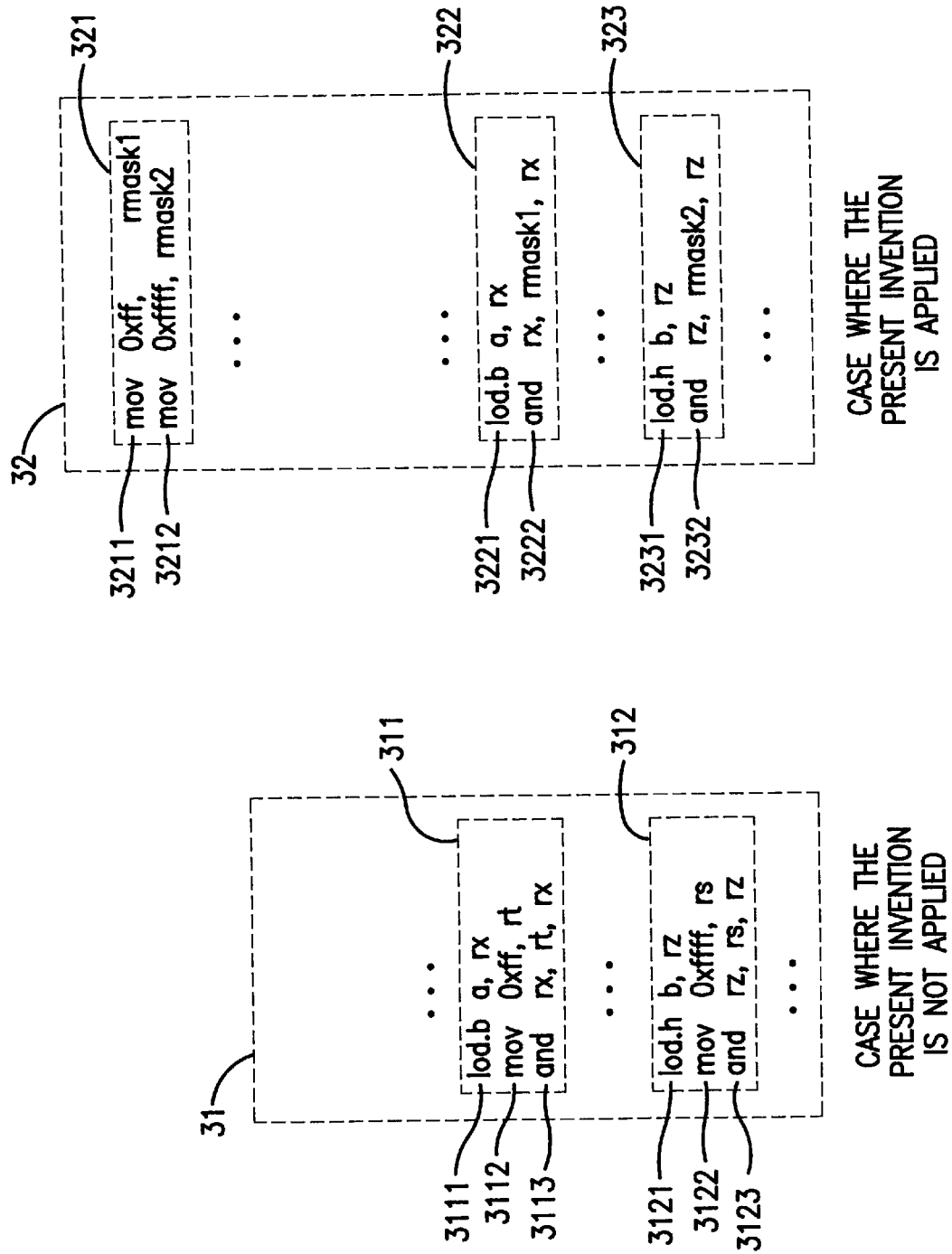
FIG. 3 is a diagram showing an example of the code of the object program 24 generated by the compile apparatus 11. in the embodiment of the present invention.

FIG. 3 is a diagram showing an example of the code of the object program 24 generated by the compile apparatus 11. A description will be made by comparing the code 31 of the object program 24 of the case where part of a register is not acquired with the code 32 of the object program 24 of the case where part of a register is acquired only for a specific mask value.

For a target hardware where the code of FIG. 3 is operated, the register width is limited to 32 bits and an arithmetic operand to a register. The target hardware is also limited to one which has the characteristic that a value, or a constant, on a memory is used after it is stored in a register and that there are load instructions of 8-bit width and 16-bit width from a memory to a register.

Codes 311 and 322 indicate the sequence of operations of the case where the value of an 8-bit width variable, a, is loaded from a memory, and codes 312 and 323 indicate the sequence of operations of the case where the value of a 16-bit width variable, b, is loaded from a memory.

The loading of the value of the variable, a, is executed by an instruction 3111 to load an 8-bit value from a memory position of (a) into a register (rx), an instruction 3112 to store a mask value (oxff), for invalidating a value other than an 8-bit value, in a register (rt), and a mask instruction 3113, in the code 311 where part of a register is not acquired only for a specific mask value.

In the code 322 where part of a register is acquired only for a specific mask value, the loading of the variable is executed by an instruction 3221 to load an 8-bit value from a memory position of (a) into a register (rx) and a mask instruction 3222 using an 8-bit mask value-only register (rmaskl).

Similarly, the loading of the value of the variable, b, is executed by an instruction 3121 to load a 16-bit value from a memory position of (b) into a register (rz), an instruction 3122 to store a mask value (Oxffff), for invalidating a value other than an 16-bit value, in a register (rs), and a mask instruction 3123, in the code 312 where part of a register is not acquired only for a specific mask value.

In the code 323 where part of a register is acquired only for a specific mask value, the loading of the variable is executed by an instruction 3231 to load a 16-bit value from a memory position of (b) into a register (rz) and a mask instruction 3232 using a 16-bit mask value-only register (rmask2).

Also, when part of a register is acquired only for a specific mask value, code 321 including an instruction 3211 to store the mask value (Oxff) in the register (rmask1) and also including an instruction 3212 to store the mask value (Oxffff) in the register (rmask2) is inserted into the head of a program.

A distinctive feature of the compile apparatus of the first embodiment of the present invention is that the mask value-only register acquisition means 114 acquires a single dedicated register with respect to a specific mask instruction; the register allocation means 115 allocates a variable and a constant to a register other than a mask instruction register; and the code generation means 116 generates code, where a mask instruction register is taken to be an operand, with respect to a mask instruction using a mask value and also generates code by an ordinary method with respect to other instructions. Lastly, the mask value setting instruction insertion means 117 inserts an instruction to set a mask value for mask instruction register into the head of a generated object program. For an object program converted from a source program where it is predictable that a number of the same mask values are used, the number of mask instruction executions can be reduced, so there is the advantageous effect that an object program whose size is small can be generated.

The compiler, which is another embodiment of the present invention, includes: a syntax analysis data structure causing a computer to input a source program and perform the grammatical error checking and structure analysis thereof to convert it to an intermediate format program for performing optimization and register allocation; an optimization data structure causing a computer to perform various kinds of optimization with respect to the intermediate format program converted by the syntax analysis step to convert it to an intermediate format program whose efficiency is better; a code generation method selection data structure causing a computer to input a user's indication which specifies whether or not part of a register is acquired only for a specific mask instruction; a mask value-only register acquisition data structure causing a computer to acquire part of a register which can be allocated at the time of code generation only for a specific mask instruction; a register allocation data structure causing a computer to allocate a register other than the register acquired by using the mask value-only register acquisition data structure to a variable and a constant; a code generation data structure causing a computer to generate code by using the mask instruction register as an operand with respect to a mask instruction where a specific mask value is taken to be an operand; and a mask value setting instruction insertion data structure causing a computer to insert an instruction to store a mask value in the acquired dedicated register into the head of an object program. The compiler performs the same processing as the compile apparatus which is the aforementioned embodiment.

Note that the compiler can be stored in a storage medium, such as a memory, a disk, a floppy disk, and a CD-ROM.

As has been described above, the compile apparatus and compiler of the present invention have the advantageous effect that an object program with a small size and better execution efficiency can be generated, because the number of mask instruction executions can be reduced for an object. program converted from a source program where it is predictable that a number of the same mask values are used.

What is claimed is:

1. A computer-implemented method of receiving a source program and compiling instructions constituting an object program corresponding to the source program, comprising the steps of:

a first code generation step of generating mask instructions, each mask instruction containing, as an operand, the name of a mask value-only register which has been preacquired to store a mask value to be used in the mask instruction;

a second code generation step of generating instructions, each of which instructions sets a mask value into a mask value-only register for storing the mask value before the execution of mask instructions using the mask value; and generating code wherein variable data and constant data are allocated to registers other than said mask value-only registers, in instructions other than said mask instructions.

2. A computer-implemented method of receiving a source program and compiling instructions constituting an object program corresponding to the source program, comprising the steps of:

a mask value-only register acquisition step of acquiring one or more registers as mask-value only registers for storing mask values, respectively;

a first code generation step of generating mask instructions, each mask instruction containing, as an oderand; the name of a mask value-only register for storing a mask value to be used in the mask instruction;

a second code generation step of generating instructions, each of which instructions sets a mask value into a mask value-only register for storing the mask value before the execution of mask instructions using the mask value; and generating code wherein variable data and constant data are allocated to registers other than said mask value-only registers, in instructions other than said mask instructions.

3. A computer-implemented method of receiving a source program and compiling instructions constituting an object program corresponding to the source program, comprising:

a code generation method selection step of receiving an indication from a user as to whether or not one or more registers are to be acquired as mask value-only registers for storing mask values, respectively;

a mask value-only register acquisition step of acquiring one or more registers as said mask-value only registers when said code generation method selection means receives from said user an indication that one or more registers are to be acquired as said mask value-only registers;

a first code generation step of generating mask instructions, each mask instruction containing, as an operand, the name of a mask value-only register to store a mask value to be used in the mask instruction;

a second code generation step of generating instructions, each of which instructions sets a mask value into a mask value-only register for storing the mask value before the execution of mask instructions using the mask value; and generating code wherein variable data and constant data are allocated to registers other than said mask value-only registers, in instructions other than said mask instruction.

* * * * *